(12) United States Patent
Akiyama

(10) Patent No.: US 10,882,013 B2
(45) Date of Patent: Jan. 5, 2021

(54) MANUFACTURING METHOD OF GRANULES AND MANUFACTURING APPARATUS THEREOF WITH ABILITY TO ROCK AN AGITATING BLADE

(71) Applicant: TOYOTA JIDOSHA KABUSHIKI KAISHA, Toyota (JP)

(72) Inventor: Naohisa Akiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 16/137,905

(22) Filed: Sep. 21, 2018

(65) Prior Publication Data

US 2019/0099726 A1 Apr. 4, 2019

(30) Foreign Application Priority Data

Oct. 4, 2017 (JP) ................................. 2017-194596

(51) Int. Cl.
| | | |
|---|---|---|
| *B01F 3/12* | (2006.01) | |
| *B01F 7/04* | (2006.01) | |
| *B01F 7/00* | (2006.01) | |
| *B01F 7/16* | (2006.01) | |
| *B01J 2/10* | (2006.01) | |
| *B02C 18/14* | (2006.01) | |

(Continued)

(52) U.S. Cl.
CPC ............ *B01F 3/12* (2013.01); *B01F 7/00133* (2013.01); *B01F 7/041* (2013.01); *B01F 7/166* (2013.01); *B01J 2/10* (2013.01); *H01M 4/04* (2013.01); *H01M 4/133* (2013.01); *H01M 4/1393* (2013.01); *H01M 4/621* (2013.01);

*B02C 18/142* (2013.01); *H01M 4/587* (2013.01); *H01M 10/0525* (2013.01)

(58) Field of Classification Search
CPC ........ B01F 3/12; B01F 7/041; B01F 7/00133; B01F 7/166; H01M 4/1393; H01M 4/621; H01M 4/04; H01M 4/133; H01M 4/587; H01M 10/0525; B01J 2/10; B02C 18/142
USPC ........................................................ 366/311
See application file for complete search history.

(56) References Cited

U.S. PATENT DOCUMENTS

| 1,366,777 | A | * | 1/1921 | Flowers | .............. B01F 7/00208 366/311 |
| 4,571,091 | A | * | 2/1986 | Pardo | ...................... B01F 7/165 366/311 |

(Continued)

FOREIGN PATENT DOCUMENTS

| JP | 2017-104784 A | 6/2017 |
| JP | 2017-127843 A | 7/2017 |

*Primary Examiner* — Charles Cooley
(74) *Attorney, Agent, or Firm* — Sughrue Mion, PLLC

(57) ABSTRACT

A dry stirrer configured to stir powder in a dry state, and a wet stirrer provided downward of the dry stirrer in the vertical direction and configured to stir the powder are used. In the wet stirrer, the powder is stirred together with a fluid component, so that granules are formed. The wet stirrer includes a stirring chamber having a cylindrical shape and having a central axis placed in the lateral direction, a cut blade configured to rotate around the central axis of the cylindrical shape in the stirring chamber, and an agitating blade configured to rotate along an inner wall that is a cylindrical side face inside the stirring chamber. When the agitating blade passes above the central axis of the stirring chamber in the vertical direction, the agitating blade is rocked.

8 Claims, 9 Drawing Sheets

(51) Int. Cl.
*H01M 4/62* (2006.01)
*H01M 4/04* (2006.01)
*H01M 4/133* (2010.01)
*H01M 4/1393* (2010.01)
H01M 10/0525 (2010.01)
H01M 4/587 (2010.01)

(56) References Cited

U.S. PATENT DOCUMENTS

| | | | | |
|---|---|---|---|---|
| 4,790,667 A | * | 12/1988 | Pardo | B01F 7/00166 366/311 |
| 5,421,651 A | * | 6/1995 | Pickering | B01F 7/00208 366/311 |
| 5,489,152 A | * | 2/1996 | Rumph | B01F 7/00075 366/311 |
| 6,523,996 B2 | * | 2/2003 | Proper | B01F 7/00058 366/314 |
| 6,899,455 B2 | * | 5/2005 | Proper | B01F 7/00058 366/285 |
| 2017/0209887 A1 | | 7/2017 | Ikeda et al. | |
| 2019/0076797 A1 | * | 3/2019 | Akiyama | B01F 13/1016 |
| 2019/0099726 A1 | * | 4/2019 | Akiyama | B01J 2/10 |

* cited by examiner

MANUFACTURING METHOD OF GRANULES AND MANUFACTURING APPARATUS THEREOF WITH ABILITY TO ROCK AN AGITATING BLADE

INCORPORATION BY REFERENCE

The disclosure of Japanese Patent Application No. 2017-194596 filed on Oct. 4, 2017 including the specification, drawings and abstract is incorporated herein by reference in its entirety.

BACKGROUND

1. Technical Field

The disclosure relates to a method for manufacturing granules by granulating powder and a fluid component and an apparatus for manufacturing the granules. More specifically, the disclosure relates to a method for manufacturing granules by performing stirring at two stages, i.e., dry stirring in which powder is stirred before a fluid component is added to the powder and wet stirring in which the powder is stirred with the fluid component, and an apparatus for manufacturing the granules.

2. Description of Related Art

In the related art, particulate granules are manufactured by mixing powder and a fluid component at such a compounding ratio that an amount of the fluid component is set to be small as compared to so-called paste. One example of such a technique is described in Japanese Unexamined Patent Application Publication No. 2017-104784 (JP 2017-104784 A). In the technique of the publication, as illustrated in FIG. 1 thereof, a "dry mixer 1" and a "wet mixer 2" are used. Granules are obtained such that powder is stirred and mixed without a fluid component in the "dry mixer 1," and after that, the powder is stirred with a solvent in the "wet mixer 2." The granules are then formed into a "granular sheet 35" by an "A-roll 41" and a "B-roll 42."

SUMMARY

However, the technique in the related art described above has the following problem. The granules thus manufactured include a granule with a large particle diameter. JP 2017-104784 A also mentions the "formation of large-diameter particles" as a problem. In order to solve the problem, in JP 2017-104784 A, the granules provided in the "wet mixer 2" are immediately deposited to be formed as the "granular sheet 35." Thus, deposition of the granules is performed before disappearance of the fluid component is caused during storage of the granules and increase in particle diameter is caused due to bonding between granules.

However, such measures are still insufficient, and in the first place, granules that are large to some extent are included in the granules obtained in the "wet mixer 2." This is caused because some powder in the "wet mixer 2" is hardly subjected to stirring. That is, powder supplied from the "dry mixer 1" to the "wet mixer 2" and gathered in the bottom of the "wet mixer 2" at an early stage is not stirred by a "finely granulating blade 21." In order to deal with such a situation, the powder thus gathered in the bottom is scooped by a "scooping blade 22." However, some powder is kept attached to the "scooping blade 22," so that such powder is eventually formed into large granules without being stirred sufficiently.

The disclosure provides a manufacturing method of granules and a manufacturing apparatus thereof each of which restrains generation of large granules in resultant granules.

One aspect of the disclosure relates to a manufacturing method of granules, and the manufacturing method includes: stirring powder in a dry state by use of a dry stirrer; and forming granules by stirring the powder supplied from the dry stirrer together with a fluid component by use of a wet stirrer provided downward of the dry stirrer in a vertical direction and configured to stir the powder. The wet stirrer includes a stirring chamber having a cylindrical shape and having a central axis placed horizontally, a cut blade configured to rotate around the central axis in the stirring chamber, and an agitating blade configured to rotate along a side wall surface that is a cylindrical side face inside the stirring chamber. When the agitating blade passes above the central axis of the stirring chamber in the vertical direction, the agitating blade is rocked.

Further, a second aspect of the disclosure relates to a manufacturing apparatus of granules, and the manufacturing apparatus includes a dry stirrer and a wet stirrer. The dry stirrer is configured to stir powder in a dry state. The wet stirrer is provided downward of the dry stirrer in a vertical direction and configured to stir the powder. The wet stirrer is configured to stir the powder supplied from the dry stirrer together with a fluid component. The wet stirrer includes a stirring chamber having a cylindrical shape and having a central axis placed horizontally, a cut blade configured to rotate around the central axis in the stirring chamber, an agitating blade configured to rotate along a side wall surface that is a cylindrical side face inside the stirring chamber, and a rocking portion configured to rock the agitating blade at a time when the agitating blade passes above the central axis of the stirring chamber in the vertical direction.

In each of the aspects, first, the dry stirrer performs stirring targeted only for the powder without adding the fluid component, that is, the dry stirrer performs dry stirring. Hereby, aggregates in the powder are broken. After that, the powder is moved from the dry stirrer to the wet stirrer and subjected to wet stirring. That is, the fluid component is added to the powder, so that the powder is stirred together with the fluid component. In the wet stirring, the cut blade and the agitating blade are used. The cut blade cuts and miniaturizes objects made of the powder and the fluid component near the central axis of the stirring chamber of the wet stirrer. The agitating blade scoops the powder and the fluid component gathered in the bottom of the stirring chamber so that they are subjected to stirring by the cut blade again. Here, the cut blade is rocked by the rocking portion at the time when the cut blade passes by the upper part of the stirring chamber. This prevents the powder and the fluid component from remaining attached to the cut blade. Thus, almost all the powder and the fluid component in the stirring chamber are cut by the cut blade successfully so as to become minute granules.

In the manufacturing method and the manufacturing apparatus in the aspects, the agitating blade may be a flat plate extending along the central axis; and one end of the agitating blade may be supported by a support shaft extending along the central axis. The one end may be on an opposite side of the agitating blade from the side wall surface.

In the manufacturing method and the manufacturing apparatus in the aspects, the agitating blade may be pressed against the side wall surface, the agitating blade may include a magnetic body in at least one end of the agitating blade in an axial direction of the stirring chamber, and the wet stirrer may include a magnet in an outer part of at least one end surface of the stirring chamber in the axial direction of the stirring chamber. The magnet may be placed at a position where the agitating blade is temporarily separated from the side wall surface at the time when the agitating blade passes above the central axis of the stirring chamber in the vertical direction.

With such a configuration, when the agitating blade passes above the central axis of the stirring chamber in the vertical direction, the agitating blade is definitely rocked by magnetic force of the magnet. Hereby, the effect to prevent the powder and the fluid component from being attached to the cut blade can be surely obtained. Further, a mechanism for rocking the agitating blade can be configured extremely simply.

In the manufacturing method and the manufacturing apparatus in the aspects, the agitating blade may include a boss projecting outwardly in the axial direction of the stirring chamber, and a cam groove provided along a circular shape of the cylindrical shape may be provided on at least one end surface of the stirring chamber in the axial direction of the stirring chamber. The cam groove may have a bent part that is bent such that the locus of the cam groove comes closer to the central axis above the central axis in the vertical direction, and the boss may be fitted within the cam groove.

In the manufacturing method and the manufacturing apparatus in the aspects, the rotation direction of the cut blade and the rotation direction of the agitating blade may be reverse to each other.

With the present configuration, it is possible to provide a manufacturing method of granules and a manufacturing apparatus thereof each of which restrains generation of large granules in resultant granules.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
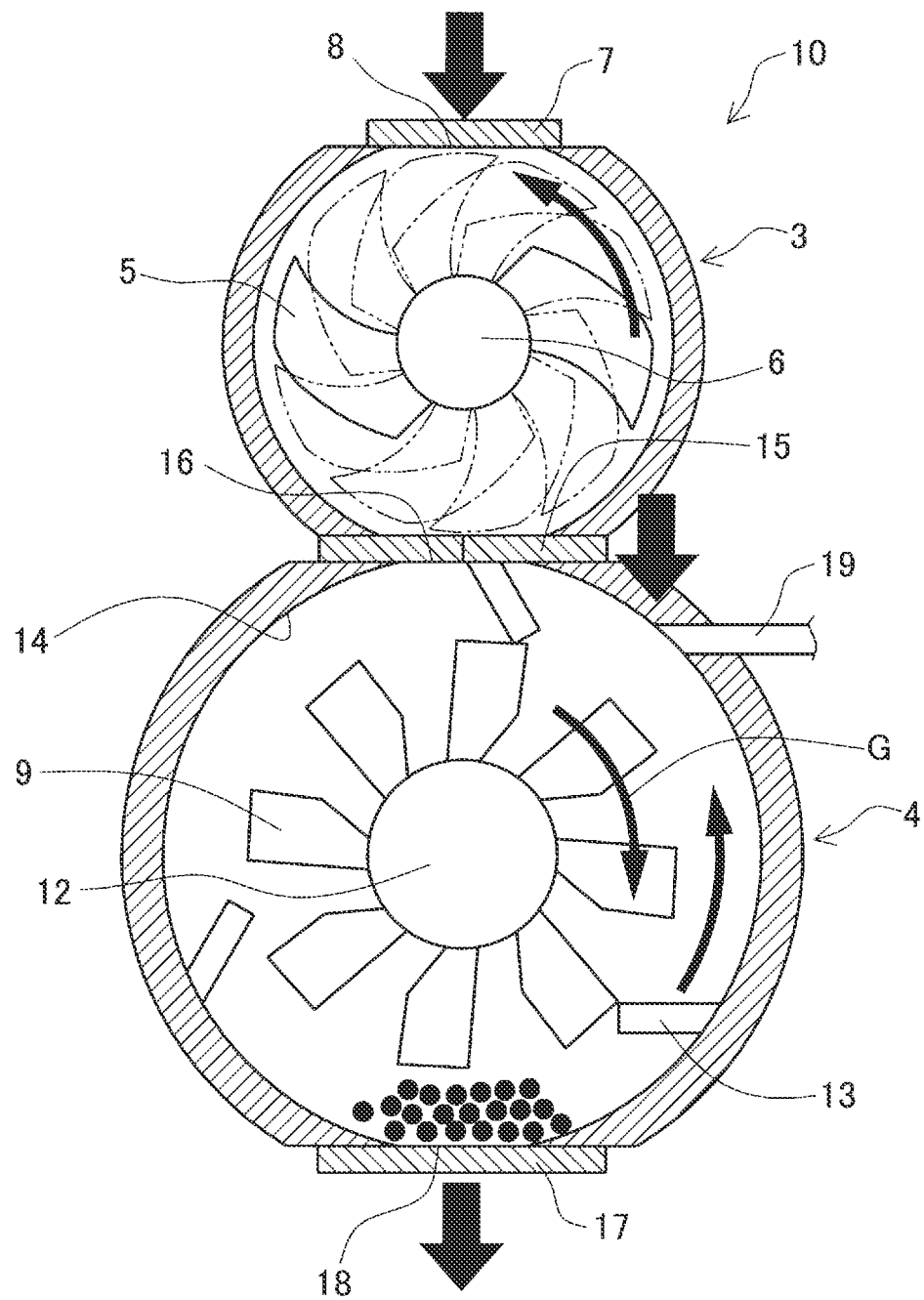
FIG. 1 is a sectional view of a manufacturing apparatus of granules according to an embodiment.
Figure 2:
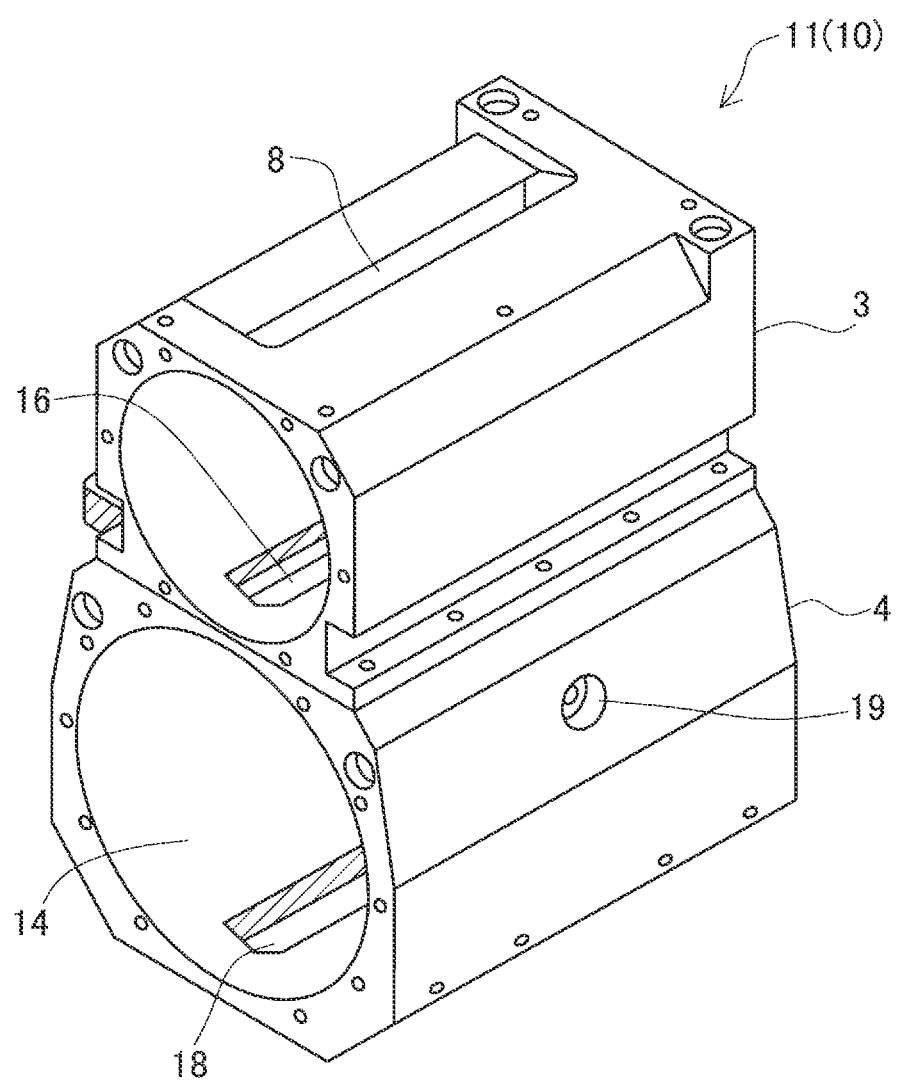
FIG. 2 is a perspective view illustrating the manufacturing apparatus in FIG. 1 without constituents inside the manufacturing apparatus.

The following describes an embodiment for embodying the disclosure in detail with reference to the attached drawings. The present embodiment embodies the disclosure as an apparatus and a method suitable for manufacturing granules of active material powder for forming an electrode active material layer in a manufacturing process of a battery. A manufacturing apparatus 10 of granules according to the present embodiment is generally configured as illustrated in FIGS. 1 and 2. As illustrated in a sectional view of FIG. 1, the manufacturing apparatus 10 includes an upper dry stirrer 3 and a lower wet stirrer 4. Here, "upper" indicates an upper side in a vertical direction and "lower" indicates a lower side in the vertical direction. Further, as seen in a perspective view of a structure 11 of the manufacturing apparatus 10 illustrated in FIG. 2, the dry stirrer 3 and the wet stirrer 4 have a cylindrical shape and are placed so that their respective axial directions are horizontal.

As illustrated in FIG. 1, dispersion blades 5 are provided inside the dry stirrer 3. The dispersion blades 5 are attached to a rotating shaft 6. The dispersion blades 5 rotate inside the dry stirrer 3 along with rotation of the rotating shaft 6. The rotating shaft 6 is provided along the central axis of the cylindrical shape of the dry stirrer 3. Further, a shutter 7 is provided on the upper side of the dry stirrer 3. An input port 8 that is opened is formed in an upper part of the dry stirrer 3, and the shutter 7 opens and closes the input port 8.

Blades that rotate are also provided inside the wet stirrer 4. The blades of the wet stirrer 4 are called cut blades 9. The cut blades 9 are also attached to a rotating shaft 12 and rotate along with rotation of the rotating shaft 12. The rotating shaft 12 is provided along the central axis of the cylindrical shape of the wet stirrer 4. Further, agitating blades 13 are also provided inside the wet stirrer 4 in addition to the cut blades 9. The agitating blades 13 also rotate around the axis inside the wet stirrer 4, but the agitating blades 13 are placed apart from the rotating shaft 12 so as to rotate along an inner wall 14 of the wet stirrer 4. Note that the rotation direction of the cut blades 9 and the rotation direction of the agitating blades 13 are reverse to each other.

In the configuration, the rotating shaft 6 and the rotating shaft 12 are separately driven to rotate by mechanisms provided outside the structure 11. Further, the agitating blades 13 are driven to rotate by a mechanism provided outside the structure 11, separately from the rotating shaft 12. The mechanisms for the rotational driving can be easily achieved by a combination of techniques of the related art, so that the mechanisms are not illustrated or described herein. Further, a shutter 15 is provided between the dry stirrer 3 and the wet stirrer 4. A transfer opening 16 that is opened is formed between the dry stirrer 3 and the wet stirrer 4, and the shutter 15 opens and closes the transfer opening 16. Further, a shutter 17 is provided on the lower side of the wet stirrer 4. A discharge port 18 that is opened is formed in a lower part of the wet stirrer 4, and the shutter 17 opens and closes the discharge port 18.

Further, the wet stirrer 4 is provided with a liquid delivery nozzle 19. In the meantime, the dry stirrer 3 is not provided with a liquid delivery nozzle. Note that FIG. 2 illustrates only the structure 11 such that constituents (the rotating shaft 6, the dispersion blades 5, the rotating shaft 12, the cut blades 9, and the agitating blades 13) inside the dry stirrer 3 and the wet stirrer 4 are removed from the manufacturing apparatus 10.

Figure 3:
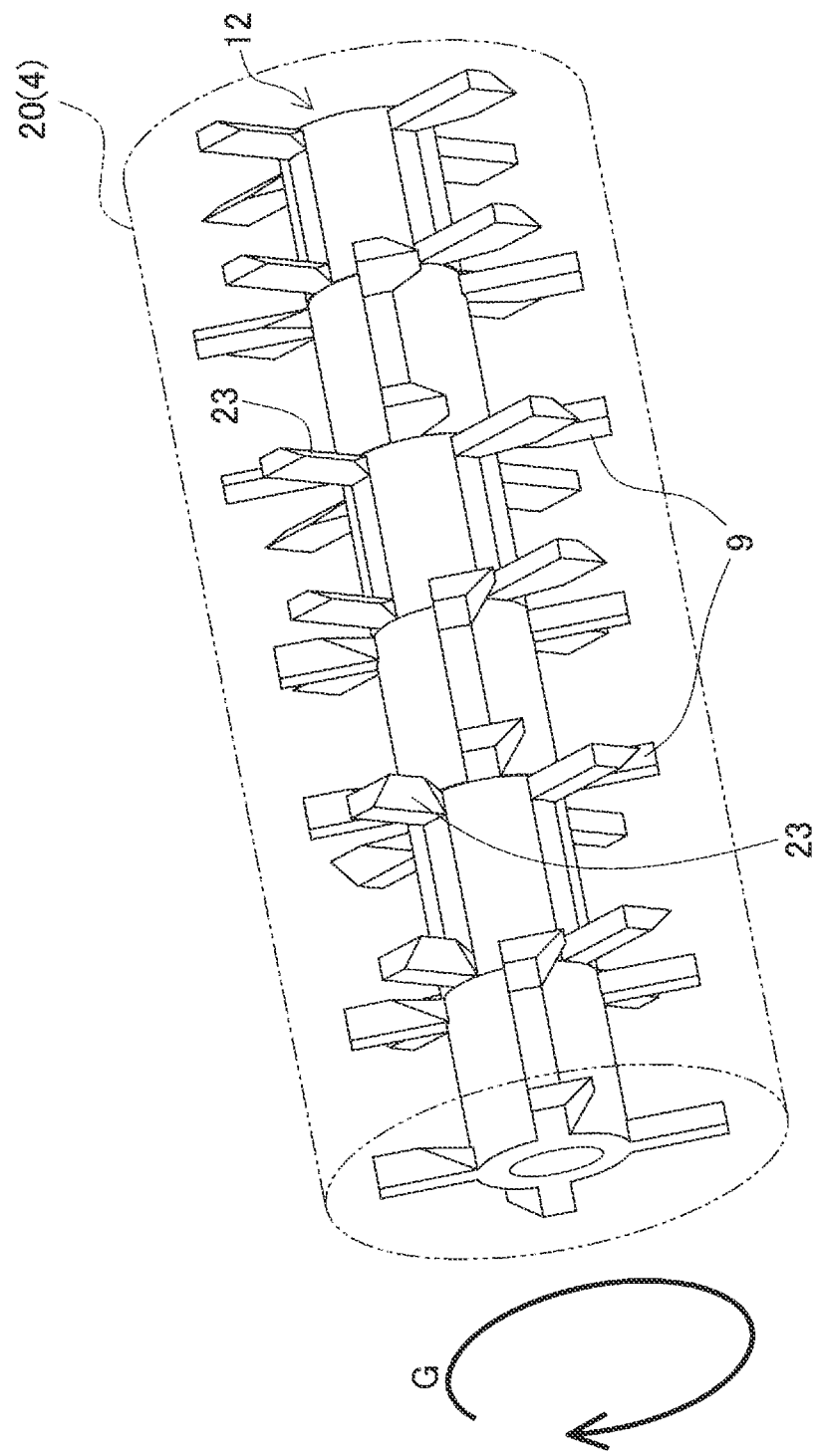
FIG. 3 is a perspective view illustrating cut blades and a rotating shaft thereof both provided in a wet stirrer.

As illustrated in FIG. 3, the cut blades 9 of the wet stirrer 4 are columnar members provided over the entire length of the rotating shaft 12. The front surface of the cut blade 9 in a rotation direction G has an inclined surface 23. Note that the dispersion blades 5 of the dry stirrer 3 are generally the same as the cut blades 9 in that the dispersion blades 5 are provided over the entire length of the rotating shaft 6.

Figure 4:
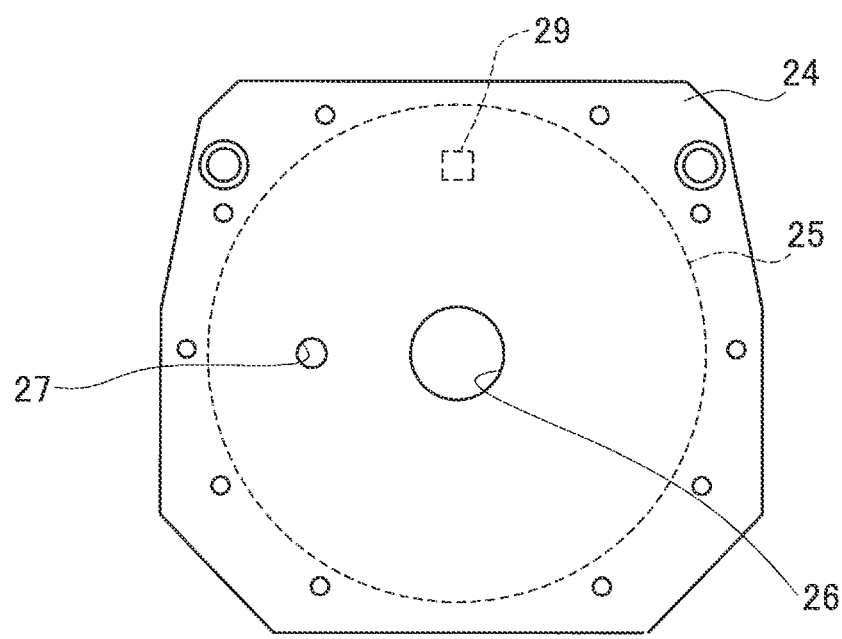
FIG. 4 is a front view illustrating a cover member configured to close an end of the wet stirrer.

Subsequently, ends of the dry stirrer 3 and the wet stirrer 4 will be described. In the structure 11 of FIG. 2, the dry stirrer 3 and the wet stirrer 4 are illustrated such that their ends are opened. However, in a state where the manufacturing apparatus 10 is actually used, the ends of the dry stirrer 3 and the wet stirrer 4 are closed naturally. In terms of this point, closing of the end of the wet stirrer 4 will be described. The end of the wet stirrer 4 (a stirring chamber 20) is closed by a cover member 24 illustrated in FIG. 4 at the time of actual use. FIG. 4 is a view in which the cover member 24 is viewed from its inner surface side. Note that the up-down direction in FIG. 4 corresponds to the up-down direction in FIG. 1.

A circle 25 drawn by a broken line in the cover member 24 in FIG. 4 is a circle corresponding to the inner wall 14 of the wet stirrer 4. A hole 26 is formed in the center of the circle 25. The hole 26 is a hole for power transmission to the rotating shaft 12 in FIG. 3. The driving of the agitating blades 13 illustrated in FIG. 1 is also performed via the hole 26. The hole 26 is closed by such power-to-be-transmitted members in practice, so that an airtight state is formed. An exhaust port 27 is further formed inside the circle 25 in the cover member 24. Even in a state where the end of the stirring chamber 20 is closed by the cover member 24, air can move inside and outside the stirring chamber 20 via the exhaust port 27. The exhaust port 27 is placed at a generally middle height in the up-down direction in the circle 25. Further, the exhaust port 27 is provided at a position other than a part where the hole 26 is provided. Of course, both ends of the stirring chamber 20 are closed by respective cover members 24.

Although not illustrated herein, the ends of the dry stirrer 3 are also closed by cover members configured generally in the same manner as the cover member 24 in FIG. 4. Naturally, the cover members for the dry stirrer 3 have the size corresponding to the dry stirrer 3. Further, it is not necessary that an exhaust port corresponding to the exhaust port 27 be formed in the cover members for the dry stirrer 3.

The agitating blades 13 of the wet stirrer 4 will be further described. The agitating blades 13 are configured such that a plurality of flat and long members is placed in parallel to the rotating shaft 12 along the inner wall 14. In FIG. 1, three members seem to exist independently as the agitating blades 13. However, these three agitating blades 13 are actually connected to each other and rotate around the rotating shaft 12 together in an integrated manner.

Figure 5:
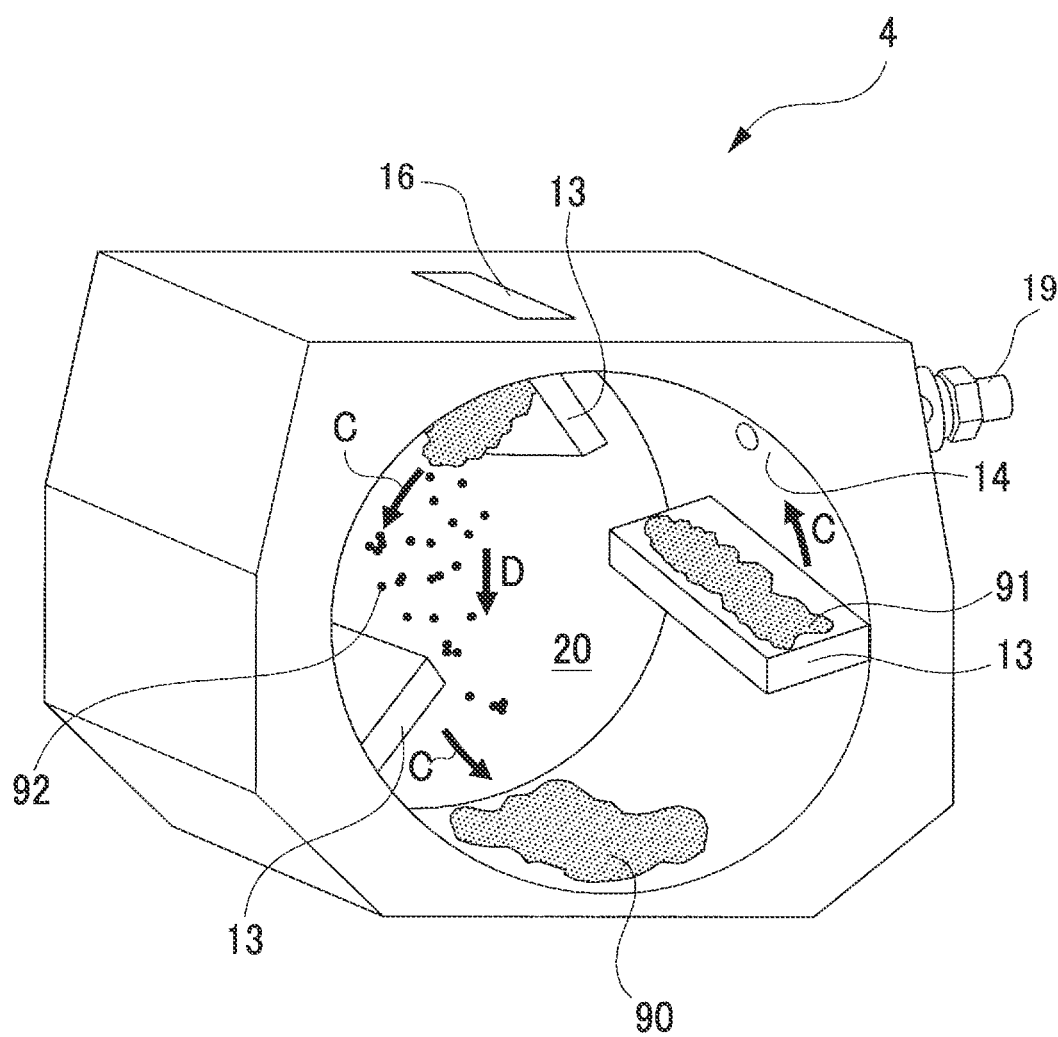
FIG. 5 is a perspective view to describe stirring of powder in the wet stirrer.

Hereby, as illustrated in FIG. 5, when the agitating blades 13 rotate as indicated by an arrow C, powder is stirred. That is, powder 90 gathered in the bottom of the stirring chamber 20 is scooped by the agitating blades 13 thus rotating. When scooped powder 91 reaches the upper part of the stirring chamber 20, the powder 91 slides from the agitating blades 13 and falls downward as indicated by an arrow D. Falling powder 92 is subjected to stirring by the cut blades 9. Even if the falling powder 92 is partially gathered in the bottom again, the above processes are repeated so that the powder 90 is stirred. Note that, in FIG. 5, only the wet stirrer 4 of the structure 11 and the agitating blades 13 are illustrated briefly without the cut blades 9 and the rotating shaft 12.

Figure 6:
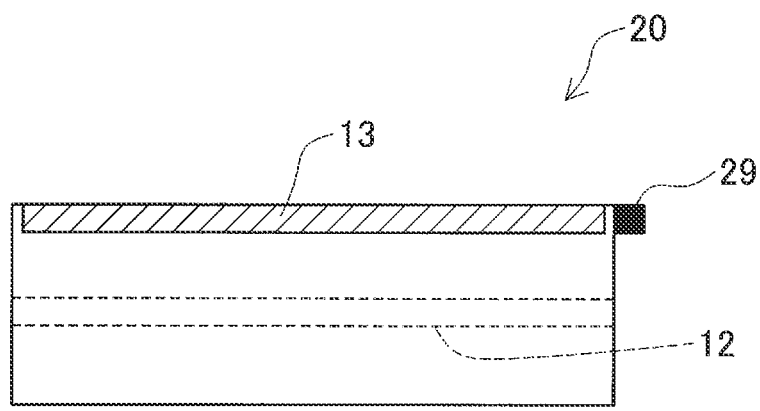
FIG. 6 is a side view illustrating an agitating blade in a stirring chamber of the wet stirrer.

Each of the agitating blades 13 is a blade-shaped member provided over the entire stirring chamber 20 along its longitudinal direction (the axial direction of the rotating shaft 12) as illustrated in FIG. 6. Note that only one of the three agitating blades 13 is illustrated in FIG. 6. Further, the agitating blade 13 is made of a magnetic body such as ferritic stainless steel or martensitic stainless steel. The reason thereof will be described later. The agitating blade 13 may be made of common steel or permalloy, but stainless steel is more preferable from the viewpoint of corrosion resistance.

Figure 7:
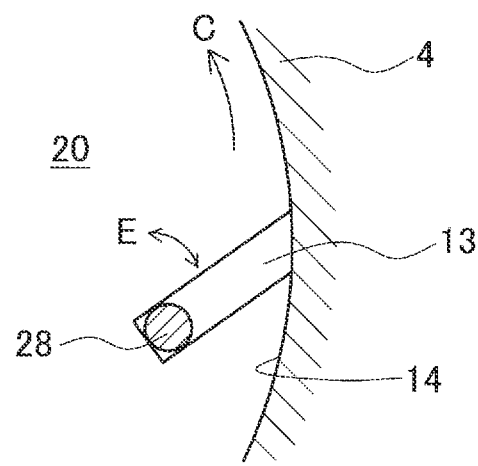
FIG. 7 is a front view illustrating a rocking configuration of the agitating blade.

As illustrated in FIG. 7, the agitating blade 13 can rock (an arrow E) around a support shaft 28. The support shaft 28 is parallel to the rotating shaft 12 of the cut blades 9. Due to rocking E around the support shaft 28, the agitating blade 13 can have two states, i.e., a state where a distal end (an end distanced from the support shaft 28) of the agitating blade 13 is pressed against the inner wall 14 and a state where the distal end is separated from the inner wall 14. The agitating blade 13 illustrated in FIG. 7 is in the state where the agitating blade 13 is pressed against the inner wall 14. Note that, due to rotation of the agitating blade 13 as indicated by an arrow C in FIG. 5, the support shaft 28 also rotates around the rotating shaft 12 in an integrated manner.

Further, the pressing of the agitating blade 13 against the inner wall 14 can be achieved by providing a well-known suitable elastic member such as a spring in the support shaft 28. Alternatively, the pressing can be achieved only by centrifugal force by rotation as indicated by the arrow C. Note that the pressing of the agitating blade 13 against the inner wall 14 is particularly necessary at the time when the agitating blade 13 passes in the vicinity of the bottom of the stirring chamber 20. This is to scoop the powder 90 gathered in the bottom. In the vicinity of the bottom, the gravity due to deadweight of the agitating blade 13 also takes part in the pressing. When the agitating blade 13 is placed at a position other than the vicinity of the bottom of the stirring chamber 20, pressing force is not so important.

With reference to FIG. 6, one of (or both of) the ends of the stirring chamber 20 includes a magnet 29. As illustrated in FIG. 4, the magnet 29 is embedded in the cover member 24. The magnet 29 is placed above the hole 26 and slightly inward of the circle 25. For example, as the magnet 29, a strong magnet such as a neodymium magnet is preferable.

Figure 8:
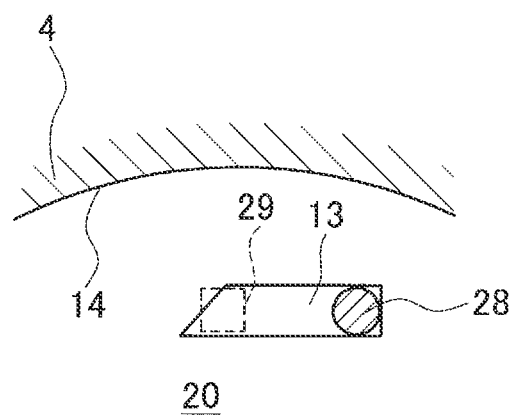
FIG. 8 is a front view illustrating rocking of the agitating blade by a magnet.

Hereby, as illustrated in FIG. 8, rocking of the agitating blade 13 is performed. That is, FIG. 8 illustrates a state at the time when the agitating blade 13 passes in the vicinity of the upper end of the stirring chamber 20 due to the rotation C in FIG. 5. At this position, the agitating blade 13 passes in the vicinity of the magnet 29. Due to the arrangement as described above, the magnet 29 exists at a position slightly close to the rotating shaft 12 from the inner wall 14.

Accordingly, when the agitating blade 13 that is a magnetic body passes by this position, the agitating blade 13 is separated from the inner wall 14 due to attraction by the magnetic force of the magnet 29. The state illustrated in FIG. 8 corresponds to this state. After the agitating blade 13 passes by the position in FIG. 8 due to the rotation C, the agitating blade 13 returns to a state where it is pressed against the inner wall 14 as before. This is because the magnetic force of the magnet 29 acts on the agitating blade 13 only at the position illustrated in FIG. 8. That is, the agitating blade 13 usually rotates (the arrow C) in a state where the agitating blade 13 is pressed against the inner wall 14. However, only when the agitating blade 13 passes in the vicinity of the upper end of the stirring chamber 20, the agitating blade 13 is separated from the inner wall 14. Thus, when the agitating blade 13 passes in the vicinity of the upper end of the stirring chamber 20, the agitating blade 13 is rocked.

Next will be described a manufacturing method of granules by the manufacturing apparatus 10 configured as described above. The manufacturing method according to the present embodiment is performed by stirring at two stages, i.e., dry stirring at a first stage and its subsequent wet stirring. Of course, the dry stirring is performed by the dry stirrer 3, and the wet stirring is performed by the wet stirrer 4.

The dry stirring in the dry stirrer 3 is performed only by use of powder components of an electrode active material and an additive material (a conductive material, a binder, and the like). That is, no liquid component (solvent) is used at this stage. This is a meaning of "dry." In the dry stirring, first, the shutter 15 is closed and the shutter 7 is opened, and base powder is put into the dry stirrer 3 from the input port 8. Then, the shutter 7 is closed and the dispersion blades 5 are rotated. This is the dry stirring. The base powder to be put into the dry stirrer 3 may be partially gathered in an aggregated state. The base powder is untied by the dry stirring, and even if there is an aggregated part, the aggregated part is broken.

When the dry stirring is finished, the wet stirring is performed subsequently. For this purpose, the shutter 17 is closed and the shutter 15 is opened. Hereby, the base powder subjected to the dry stirring in the dry stirrer 3 is supplied to the wet stirrer 4 via the transfer opening 16. When the transfer opening 16 is opened, the base powder moves naturally due to its deadweight. This is transfer.

Then, the shutter 15 is closed again, and the cut blades 9 and the agitating blades 13 are rotated. At this time, a solvent is supplied to the wet stirrer 4 from the liquid delivery nozzle 19. Thus, a liquid component is also used as well as the powder components, and this is a meaning of "wet." In the stirring chamber 20 of the wet stirrer 4, the base powder and the solvent thus supplied are stirred by the cut blades 9 and the agitating blades 13 so that granules are formed. The granules are configured such that the powder and the solvent are formed into a granular shape and the granules are much smaller than aggregates that have not been subjected to the dry stirring.

In the wet stirring, the cut blades 9 and the agitating blades 13 have different roles. The role of the cut blades 9 is to cut and miniaturize objects obtained such that the base powder and the solvent are bonded. The role of the agitating blades 13 is to scoop the base powder and the solvent deposited near the bottom of the stirring chamber 20 so that the base powder and the solvent are subjected to stirring. When the shutter 17 is opened, the granules manufactured herein are discharged downward from the discharge port 18 due to their deadweight. When a device to be used in a next process is placed below the shutter 17 in FIG. 1, the granules thus manufactured are supplied to the next process. The device for the next process is, for example, a sheet forming device such as "41" and "42" in FIG. 1 of JP 2017-104784 A. Alternatively, the formation of such a sheet may be performed on a conductive foil. Note that dry stirring of a next lot in the dry stirrer 3 may be started without waiting for the end of the wet stirring in the wet stirrer 4.

A feature point in the present embodiment is movement of the agitating blade 13 in the wet stirrer 4. That is, as described above, the agitating blades 13 are usually pressed against the inner wall 14, but are rocked at the time when the agitating blades 13 pass above the rotating shaft 12. The rocking prevents adhesion of the powder 91 to the agitating blades 13. On this account, most of the powder 91 scooped by the agitating blades 13 from the bottom is separated from the agitating blades 13 due to vibration caused by the rocking and falls down (an arrow D in FIG. 5). Accordingly, the powder 91 that remains attached to the agitating blades 13 hardly exists. Thus, most of the powder in the stirring chamber 20 is subjected to stirring by the cut blades 9 successfully. Hereby, uniform granules with a small amount of large granules are obtained.

Next will be described a test result on the effect obtained by rocking the agitating blades 13 like the present embodiment. In the test described herein, while the rotation speed of the agitating blades 13 was changed to various speeds, granules were manufactured by the manufacturing apparatus 10 at the various speeds, and respective generation states of large granules were examined. Further, for a comparison, a similar test was also performed by use of a device in which the magnet 29 is removed so that rocking is not performed. Various conditions in the present test are described as follows.

As the base powder, the following materials that are exemplary materials for a negative electrode of a lithium-ion secondary battery were used.

Active material—natural graphite

Conductive material—(not used)

Binder—carboxymethyl cellulose

Composition ratio—active material:binder=99:1 (weight ratio)

Conditions for the dry stirring are as follows.

Rotation speed of the dispersion blades 5—2000 rpm

Time of rotation of the dispersion blades 5—20 seconds

The wet stirring was performed at two stages, e.g., moistening stirring as a first stage and miniaturization stirring at a second stage. Conditions for the moistening stirring are as follows.

Solvent type—water

Solvent supply amount—amount corresponding to 73% by weight of solid content (the solvent is supplied twice in a split manner)

Rotation speed of the agitating blades 13—200 rpm

Rotation speed of the cut blades 9—2000 rpm

Stirring time—15 seconds

Conditions for the miniaturization stirring are as follows.

Additional supply of solvent—none

Rotation speed of the agitating blades 13—see Table 1

Rotation speed of the cut blades 9—2000 rpm

Stirring time—20 seconds

The results are shown in Table 1. The field of "MAGNET" in Table 1 indicates whether the magnet 29 is provided or not in the manufacturing apparatus 10. The magnet 29 is "PROVIDED" in all examples, while the magnet 29 is "NOT PROVIDED" in comparative examples. The field of "ROTATION SPEED" indicates a rotation speed of the agitating blades 13 in the miniaturization stirring. The field of "RATIO OF LARGE GRANULES" is a result of the test and indicates a weight ratio of large granules having a diameter of 4 mm or more in resultant granules. As the value of the ratio is smaller, the granules are manufactured successfully, and as the value of the ratio is larger, poor granules are manufactured.

TABLE 1

| | MAGNET | ROTATION SPEED (rpm) | RATIO OF LARGE GRANULES (wt %) |
|---|---|---|---|
| COMPARATIVE EXAMPLE 1 | NOT PROVIDED | 60 | 15 |
| COMPARATIVE EXAMPLE 2 | | 100 | 23 |
| COMPARATIVE EXAMPLE 3 | | 200 | 27.9 |
| EXAMPLE 1 | PROVIDED | 10 | 13 |
| EXAMPLE 2 | | 30 | 7.7 |
| EXAMPLE 3 | | 60 | 6 |
| EXAMPLE 4 | | 80 | 9.5 |
| EXAMPLE 5 | | 100 | 15 |
| EXAMPLE 6 | | 200 | 15 |

Figure 9:
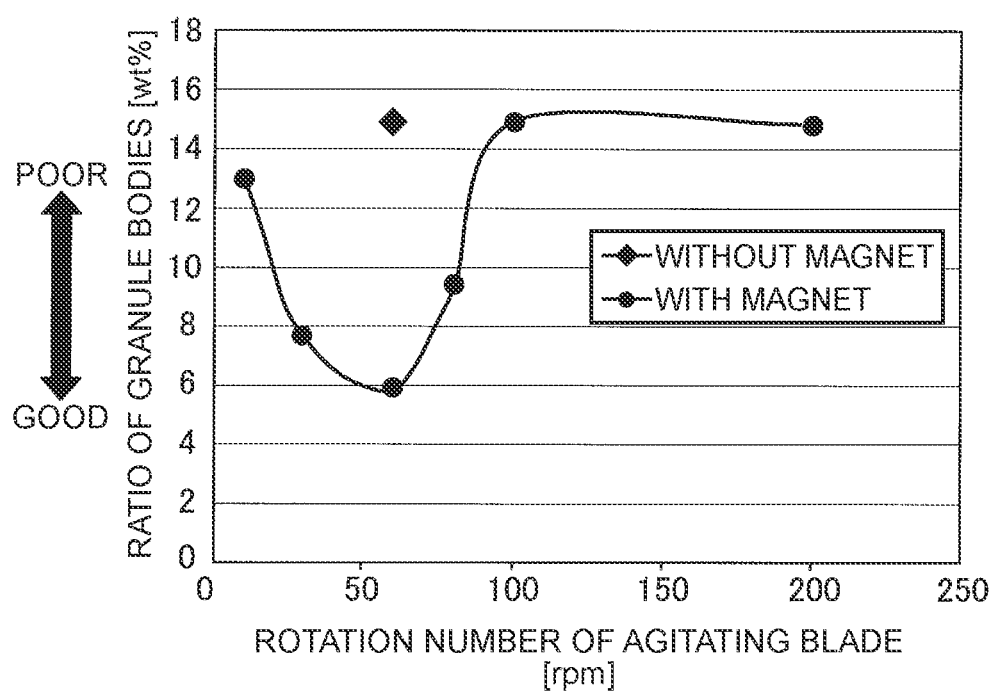
FIG. 9 is a graph showing a relationship between a rotation speed of the agitating blade and a ratio of large granules in finished granules.

A relationship between "ROTATION SPEED" and "RATIO OF LARGE GRANULES" in Table 1 is graphed in FIG. 9. From FIG. 9, it is found that a case where the magnet was provided and the rotation speed was 30 to 80 rpm (Examples 2 to 4) exhibits a markedly excellent result in comparison with a case where the magnet was not provided and the rotation speed was 60 rpm (Comparative Example 1). This is presumably because the effect by scooping of the powder 90 by the agitating blades 13 (FIG. 5) and separation of the powder 91 by rocking of the agitating blades 13 (FIGS. 5, 8) is obtained effectively.

In a case where the rotation speed was slow, e.g., 10 rpm (Example 1), a larger number of large granules were generated as compared with Examples 2 to 4. This is presumably because the number of scooping by the agitating blades 13 and rocking thereof during 20 seconds during which miniaturization stirring was performed was small, and therefore, the effect was small. Even in this case, the result was better than the result of Comparative Example 1.

Also in a case where the rotation speed was fast, e.g., 100 rpm or 200 rpm (Examples 5, 6), a larger number of large granules were generated as compared with Examples 2 to 4. This is presumably because a moving speed of the agitating blades 13 by rotation was too fast so that rocking of the agitating blades 13 by the magnet 29 was not performed sufficiently. Even in this case, the result was better than the results of cases where the rotation speed was also fast and no magnet was provided (Comparative Examples 2, 3). Note that, in the graph of FIG. 9, the results of Comparative Examples 2, 3 are not plotted because they deviate from the range of the vertical axis.

Hereby, it is found that the rotation speed of the agitating blades 13 in the wet stirring, particularly in the miniaturization stirring, is particularly preferably 30 to 80 rpm. Further, it is found that, even in cases of other rotation speeds, the effect can be still obtained in comparison with the case where the magnet 29 is not provided. Note that the description about FIG. 9 and Table 1 does not mention the moistening stirring in particular, but rocking of the agitating blades 13 is also performed in the moistening stirring.

As specifically described above, in the present embodiment, in the manufacture of granules by performing wet stirring after dry stirring by use of the dry stirrer 3 and the wet stirrer 4, the agitating blades 13 are rocked by the magnet 29 at the time when the agitating blades 13 pass on the upper side in the wet stirring in the wet stirrer 4. This prevents the base powder supplied to the wet stirrer 4 from being gathered to the bottom of the stirring chamber 20 and attached to the agitating blades 13. Thus, most of the supplied base powder is sufficiently granulated by the cut blades 9, so that uniform granules can be obtained. This achieves the manufacturing apparatus 10 of granules and the manufacturing method thereof each of which is able to provide high-quality granules with a smaller amount of large granules.

Note that the present embodiment is merely an example and does not limit the disclosure. Accordingly, it goes without saying that the disclosure can be altered or modified variously within a range that does not deviate from the gist of the disclosure. For example, a specific configuration of the dry stirrer 3 is optional, and the dry stirring may be performed by another constituent other than the dispersion blades 5. Further, a specific shape of the cut blades 9 in the wet stirrer 4 is also optional. Furthermore, the number of agitating blades 13 is not limited to three as described above. Further, the exhaust port 27 in the cover member 24 is not a necessary constituent. Further, the manufacturing apparatus 10 and the manufacturing method according to the present embodiment are not limited to the manufacture of the granules for the negative-electrode active material as described above, but can manufacture granules for a positive-electrode active material. Further, granules for purposes other than the electrode material for the battery can be also manufactured. It is also not necessary to perform the wet stirring at two stages, e.g., the moistening stirring and the miniaturization stirring.

Further, the position where the agitating blades 13 are rocked in the wet stirrer 4 is not necessarily a position right above the rotating shaft 12. The rocking should be performed at a position above the rotating shaft 12. It is further preferable that the rocking be performed at a position within an inclination angle of 30° from the position right above the rotating shaft 12 in the vertical direction. Further, the whole agitating blade 13 may not necessarily be made of a magnetic body. If an end of the agitating blade 13 on a side closer to the magnet 29 includes a magnetic body, a remaining part thereof may be made of a nonmagnetic material. However, the whole agitating blade 13 should be configured to rock integrally. Further, the rocking of the agitating blade 13 may not be a rotative motion around the support shaft 28 as illustrated in FIGS. 7 and 8. The rocking of the agitating blade 13 may be a parallel movement.

Figure 10:
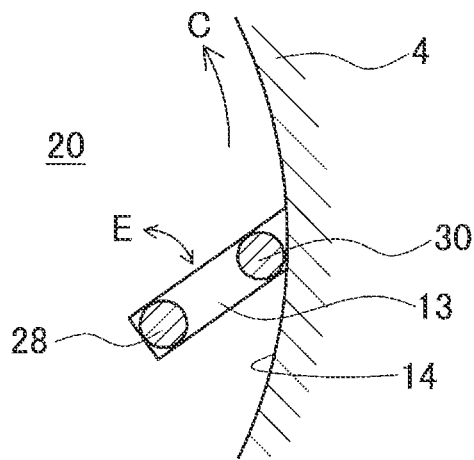
FIG. 10 is a front view of an agitating blade according to a modification.
Figure 11:
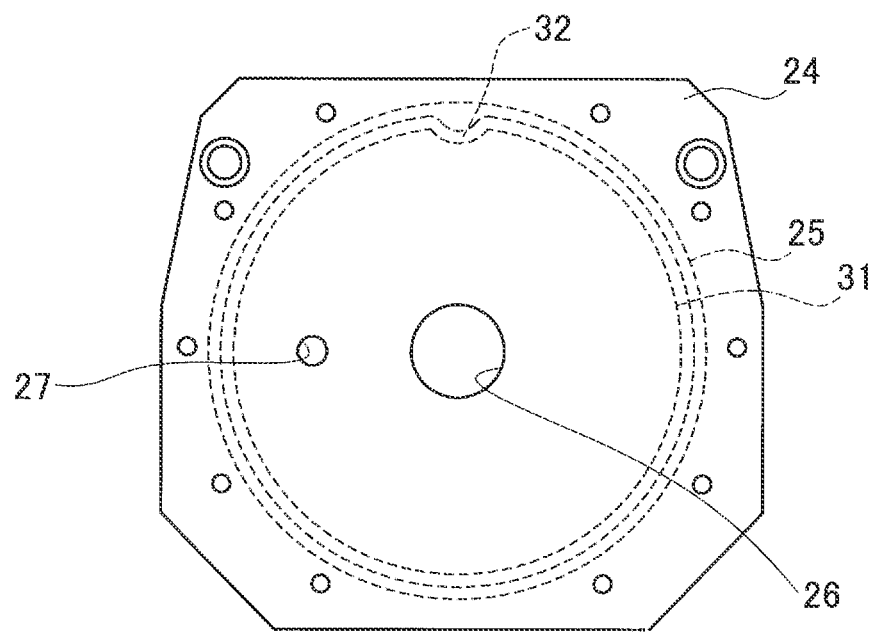
FIG. 11 is a front view of a cover member according to a modification.

Further, means for rocking the agitating blade 13 is not limited to the magnet 29. For example, the rocking of the agitating blade 13 is also achievable by a mechanism illustrated in FIGS. 10 and 11. That is, a boss 30 projecting outwardly in the longitudinal direction (the axial direction) of the stirring chamber 20 is provided around the distal end of the agitating blade 13 as illustrated in FIG. 10. In the meantime, a cam groove 31 is provided on an inner surface of the cover member 24 as illustrated in FIG. 11. The cam groove 31 is provided just inside the circle 25 (the inner wall 14) along the circle 25 in general, but a bent part 32 is formed in an upper part thereof. The bent part 32 is closer to the center than other parts. When the cover member 24 is assembled to the stirring chamber 20, the boss 30 is provided so as to enter the cam groove 31. In this configuration, when the boss 30 is in a range, of the cam groove 31, other than the bent part 32, the distal end of the agitating blade 13 is pressed against the inner wall 14 as illustrated in FIG. 10. When the boss 30 is placed in the bent part 32, rocking is performed similarly to FIG. 8. In this case, naturally, the agitating blade 13 may be a nonmagnetic material.

What is claimed is:
1. A manufacturing method of granules, the manufacturing method comprising:

stirring powder in a dry state by use of a dry stirrer; and
forming granules by stirring the powder supplied from the dry stirrer together with a fluid component by use of a wet stirrer provided downward of the dry stirrer in a vertical direction and configured to stir the powder, wherein:
the wet stirrer includes
a stirring chamber having a cylindrical shape and having a central axis placed horizontally,
a cut blade configured to rotate around the central axis in the stirring chamber, and
an agitating blade configured to rotate along a side wall surface that is a cylindrical side face inside the stirring chamber; and
when the agitating blade passes above the central axis of the stirring chamber in the vertical direction, the agitating blade is rocked, wherein:
the agitating blade is pressed against the side wall surface;
the agitating blade includes a magnetic body in at least one end of the agitating blade in an axial direction of the stirring chamber;
the wet stirrer includes a magnet on an outer part of at least one end surface of the stirring chamber in the axial direction of the stirring chamber; and
the magnet is placed at a position wherein the agitating blade is temporarily separated from the side wall surface at a time when the agitating blade passes above the central axis of the stirring chamber in the vertical direction.

2. The manufacturing method according to claim 1, wherein:
the agitating blade is a flat plate extending along the central axis; and
one end of the agitating blade is supported by a support shaft extending along the central axis, the one end being on an opposite side of the agitating blade from the side wall surface.

3. The manufacturing method according to claim 1, wherein a rotation direction of the cut blade and a rotation direction of the agitating blade are reverse to each other.

4. A manufacturing method of granules, the manufacturing method comprising:
stirring powder in a dry state by use of a dry stirrer; and
forming granules by stirring the powder supplied from the dry stirrer together with a fluid component by use of a wet stirrer provided downward of the dry stirrer in a vertical direction and configured to stir the powder, wherein:
the wet stirrer includes
a stirring chamber having a cylindrical shape and having a central axis placed horizontally,
a cut blade configured to rotate around the central axis in the stirring chamber, and
an agitating blade configured to rotate along a side wall surface that is a cylindrical side face inside the stirring chamber; and
when the agitating blade passes above the central axis of the stirring chamber in the vertical direction, the agitating blade is rocked, wherein:
the agitating blade includes a boss projecting outwardly in an axial direction of the stirring chamber;
a cam groove provided along a circular shape of the cylindrical shape is provided on at least one end surface of the stirring chamber in the axial direction of the stirring chamber;

the cam groove has a bent part that is bent such that a locus of the cam groove comes closer to the central axis above the central axis in the vertical direction; and
the boss is fitted within the cam groove.

5. A manufacturing apparatus of granules, the manufacturing apparatus comprising:
a dry stirrer configured to stir powder in a dry state; and
a wet stirrer provided downward of the dry stirrer in a vertical direction and configured to stir the powder, the wet stirrer being configured to stir the powder supplied from the dry stirrer together with a fluid component, wherein the wet stirrer includes:
a stirring chamber having a cylindrical shape and having a central axis placed horizontally;
a cut blade configured to rotate around the central axis in the stirring chamber;
an agitating blade configured to rotate along a side wall surface that is a cylindrical side face inside the stirring chamber; and
a rocking portion configured to rock the agitating blade at a time when the agitating blade passes above the central axis of the stirring chamber in the vertical direction, wherein;
the agitating blade is pressed against the side wall surface;
the agitating blade includes a magnetic body in at least one end of the agitating blade in an axial direction of the stirring chamber;
the wet stirrer includes a magnet in an outer part of at least one end surface of the stirring chamber in the axial direction of the stirring chamber; and
the magnet is placed at a position where the agitating blade is temporarily separated from the side wall surface at the time when the agitating blade passes above the central axis of the stirring chamber in the vertical direction.

6. The manufacturing apparatus according to claim 5, wherein:
the agitating blade is a flat plate extending along the central axis; and
one end of the agitating blade is supported by a support shaft extending along the central axis, the one end being on an opposite side of the agitating blade from the side wall surface.

7. The manufacturing apparatus according to claim 5, wherein a rotation direction of the cut blade and a rotation direction of the agitating blade are reverse to each other.

8. A manufacturing apparatus of granules, the manufacturing apparatus comprising:
a dry stirrer configured to stir powder in a dry state; and
a wet stirrer provided downward of the dry stirrer in a vertical direction and configured to stir the powder, the wet stirrer being configured to stir the powder supplied from the dry stirrer together with a fluid component, wherein the wet stirrer includes:
a stirring chamber having a cylindrical shape and having a central axis placed horizontally:
a cut blade configured to rotate around the central axis in the stirring chamber;
an agitating blade configured to rotate along a side wall surface that is cylindrical side face inside the stirring chamber; and
a rocking portion configured to rock the agitating blade at a time when the agitating blade passes above the central axis of the stirring chamber in the vertical direction, wherein:
the agitating blade includes a boss projecting outwardly in an axial direction of the stirring chamber;

a cam groove provided along a circular shape of the cylindrical shape is provided on at least one end surface of the stirring chamber in the axial direction of the stirring chamber;

the cam groove has a bent part that is bent such that a locus of the cam groove comes closer to the central axis above the central axis in the vertical direction; and the boss is fitted within the cam groove.

* * * * *